Feb. 3, 1948.                H. F. WILDER                2,435,258
              TELEGRAPH SIGNAL IMPULSE MEASURING DEVICE
                        Filed June 21, 1944
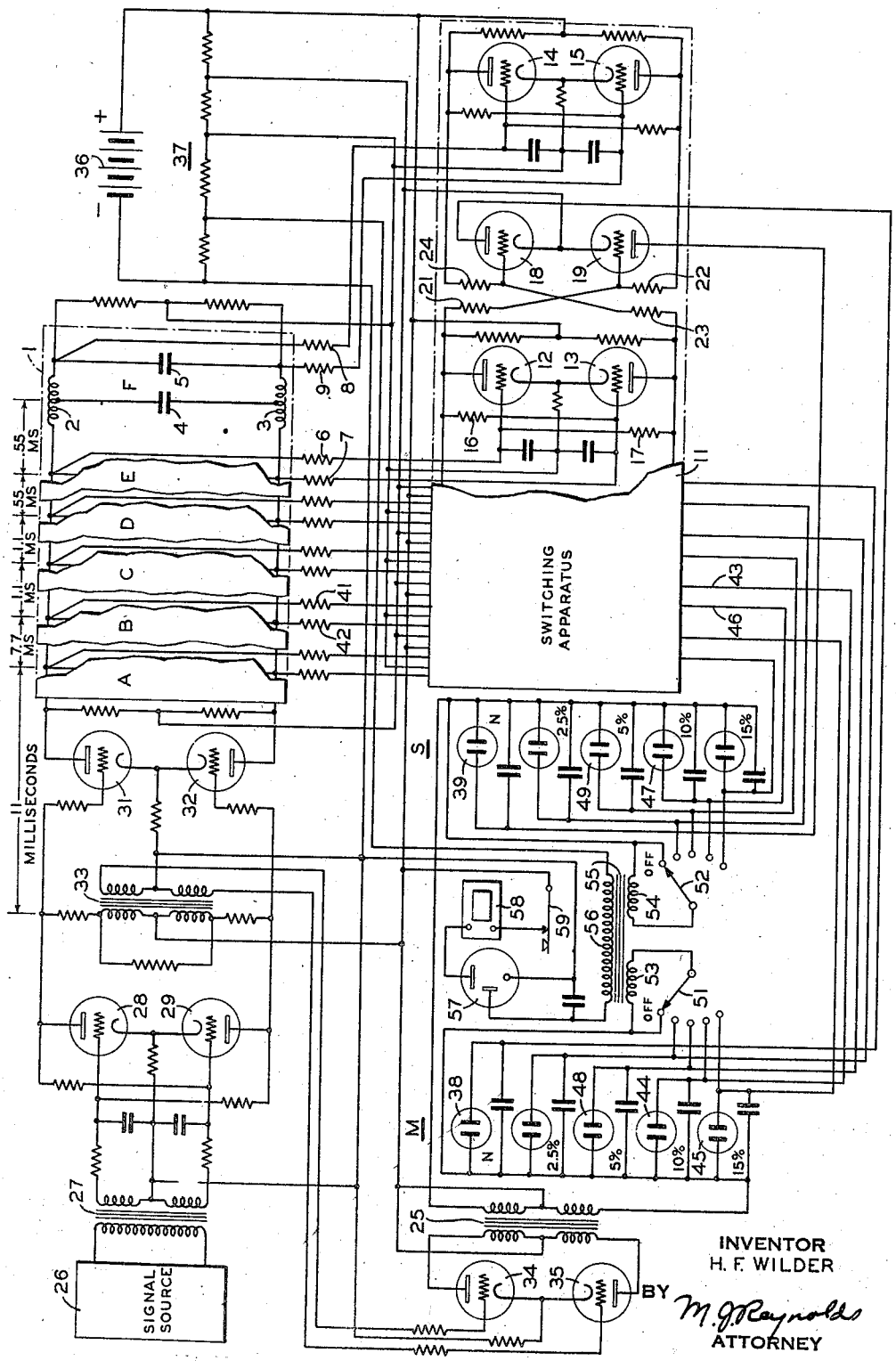
INVENTOR
H. F. WILDER
BY M. J. Reynolds
ATTORNEY

UNITED STATES PATENT OFFICE 2,435,258

TELEGRAPH SIGNAL IMPULSE MEASURING DEVICE

Harold F. Wilder, Wyckoff, N. J., assignor to The Western Union Telegraph Company, New York, N. Y., a corporation of New York Application June 21, 1944, Serial No. 541,371

8 Claims. (Cl. 178—69)

This invention relates to telegraph apparatus and has particular reference to apparatus for measuring signal distortion in a telegraph system.

In the past numerous devices have been employed for the determination and measurement of the character and amount of distortion present in telegraph signals. For the most part these devices have employed mechanisms which have been operated synchronously with the average frequency of the signals to be observed. These mechanisms are used as a standard with which the received telegraph signals are compared. Because of the synchronous relation between the mechanisms for establishing the standards and the signals which are compared therewith, it is obvious that by means of such apparatus it is possible only to determine the character and amount of distortion of the signals due to fortuitous conditions such as inductive interference and the like. Consequently, if the average frequency of the signals being observed changes, such a device will not operate to indicate the frequency change.

Hence, it is one of the objects of the invention to provide a signal distortion indicator which will not only indicate the lengthening or shortening of the signals due to extraneous causes but will also indicate any deviation in the average frequency of the signals.

Another object of the invention is to provide a signal distortion indicator having no moving parts and thereby affording more accurate indications of signal distortion.

Still another object of the invention is to provide apparatus for measuring signal distortion by comparing the telegraph signals with locally produced standard length signals.

A further object of the invention is to provide apparatus for measuring telegraph signal distortion by comparing signals with transient voltages propagated through a delay network.

An additional object of the invention is to provide apparatus for indicating both the marking or spacing bias of the signals and also the fast or slow character of the average signaling frequency.

The signal distortion indicator in accordance with the present invention employs an electrical delay network made up of a cascaded connection of a plurality of similar sections. Coincident with each change from a marking to spacing or a spacing to marking signaling condition, the voltage which is applied to one terminal of the network is reversed in polarity. Depending upon the adjustment of the parameters of the network, the voltage is in effect propagated through the network and appears at the junctions of the various sections at certain definite predetermined times after the impression upon the network. The voltages appearing at different times at the junctions of the network sections are employed to operatively condition the input circuits of a plurality of vacuum tubes. Associated with the individual output circuits of the vacuum tubes is a plurality of space discharge devices such as neon lamps.

In addition to reversing the polarity of potential applied to the delay network for each change in the signaling condition, there is also generated in response to the signaling condition change a short impulse which may furnish space current through one of the neon lamps to an operatively conditioned vacuum tube. In this case the tube becomes conducting and the neon lamp associated therewith is caused to flash.

If the signaling condition which has initiated the propagation of a voltage through the delay network is shortened by interference effects, the change from that signaling condition to the following one is effected before the transient voltage has completely traversed the delay network. In this case one of the vacuum tubes will be operatively conditioned at the time that the signaling condition change occurs so that the impulse generated thereby will cause one of the neon lamps to flash and thus indicate the distortion.

The apparatus also includes a pair of neon lamps which are operated in response to the reception of normal undistorted signals.

In the event that there is a decrease in the average signal frequency so that the average signal length is increased, such a condition is indicated by the apparatus by the extinguishing of all of the neon lamps. If the average signaling frequency increases whereby the average length of the signal impulses is decreased, then a pair of the neon lamps will be operated steadily to indicate that both marking and spacing signals are distorted, and the particular pair of lamps shows the approximate degree of such distortion.

For a more detailed description of the signal distortion indicator, reference will be made to the accompanying drawing, the single figure of which illustrates schematically an illustrative embodiment of the invention.

An electrical delay network 1 is made up of a plurality of similar sections A, B, C, D, E and F.

All of the sections are of the same character as that shown in detail for section F. Since it is desirable to effect delays of different magnitudes in different ones of the network sections, certain of these sections may comprise a plurality of the basic elements shown in section F. Such a basic element comprises a pair of intermediate tapped inductances 2 and 3, each of which is connected in series with the respective parallel conductors of the network. The intermediate taps on the inductances 2 and 3 are coupled by a condenser 4. Also corresponding terminals of each of the inductances 2 and 3 are connected by other condensers such as the condenser 5.

The voltages which appear successively at the terminals of each of the network sections are connected to control switching apparatus by means of which the indicator lamps are conditioned successively for operation. Such connections, for example, are those including resistances 6 and 7 associated with the terminals of network section E and also the pair of connections including resistances 8 and 9 associated with the terminals of network section F.

The switching apparatus 11 includes a pair of vacuum tubes for each section of the delay network. For example, switching tubes 12 and 13 are associated with the network section E and are made responsive to the potentials appearing at the terminals of this section by the respective connections of the grids of these tubes to the conductors including resistances 6 and 7. Similarly, switching tubes 14 and 15 are associated with the network section F and are made responsive to the potentials appearing at the terminals of this section by the grid connections of these tubes to the conductors including resistances 8 and 9. Each pair of such tubes is provided with inverse biasing circuits whereby the responses of the tubes are made substantially instantaneous and the tubes are definitely banked at one or the other of the two operating conditions until the polarity of the voltage applied to the input circuit is reversed. The inverse biasing circuits include a connection from the anode of one tube to the grid of the other. For example, the anode of tube 12 is connected through a resistance 16 to the grid of tube 13, and likewise the anode of tube 13 is connected through resistance 17 to the grid of tube 12.

Between each pair of switching tubes there is connected a pair of valve tubes such as the tubes 18 and 19. The input circuits of these tubes are connected in a manner to be influenced by the switching tubes on either side of the valve tubes. For example, the anodes of switching tubes 12 and 15 are connected by a pair of equal resistances 21 and 22, and the grid of the valve tube 19 is connected to the junction point of the resistances. Similarly, the anodes of switching tubes 13 and 14 are connected by equal resistances 23 and 24, and the grid of the valve tube 18 is connected to the junction point of the resistances. As the transient voltage is propagated through the delay network 1 to operate one of the switching tubes 12 or 13, the input circuit of one of the valve tubes 18 or 19 is operatively conditioned and remains so until the transient voltage appears at the terminals of section F of the delay network to operate one of the switching tubes 14 or 15, at which time both of the valve tubes are operatively conditioned.

The anodes of the valve tubes 18 and 19 are connected respectively to corresponding lamps in the banks M and S. There is provided one lamp in each of the banks for each pair of valve tubes. In the present illustrative embodiment there are five pairs of valve tubes and, consequently, five neon lamps in each of the banks M and S. The common terminals of the lamps in the respective banks M and S are connected to the terminals of the secondary winding of a transformer 25 in which there are intermittently induced short voltage impulses coincident with each change from one signaling condition to another. These short voltage impulses supply space current through a circuit including one of the lamps in the banks M and S to any valve tube such as 18 or 19, the input circuit of which is operatively conditioned at the time.

The source of signals 26, the distortion of which is to be measured, is coupled by means of a transformer 27 to the input circuits of a pair of network drive tubes 28 and 29. For the purposes of illustration it will be assumed that the signals are polar signals, although it will be obvious to one skilled in the art that the invention is not limited for use with any particular type of signals. The network drive tubes 28 and 29 are operated alternately in response to successive reverses of polarity of the signals and control a pair of power tubes 31 and 32. The output circuits of the power tubes supply the voltage which is applied to the delay network 1, and since the power tubes also operate alternately in response to signal reversals the polarity of the voltage applied to the delay network is reversed for each signal reversal. The output circuits of the network drive tubes 28 and 29 are also coupled by means of a transformer 33 to the input circuits of a pair of amplifier tubes 34 and 35. These latter tubes are rendered conducting in alternation for short periods in response to each reversal of the signaling potential and thereby cause the induction in the secondary winding of transformer 25 of the series of short voltage impulses previously referred to.

Space current, biasing potentials, etc., for the various tube circuits of the distortion indicator are supplied from a source of direct current, such as a battery 36. A voltage divider 37 is connected across the terminals of the direct current source to provide a convenient means for obtaining the various potentials necessary for the operation of the electronic devices in a manner which will be obvious to those skilled in the art. The voltage divider 37 may, if desired, include the heater elements of the various vacuum tubes in any well-known arrangement.

For a more complete understanding of the manner in which the valve tubes are conditioned for operation under the control of the switching tubes, assume that the switching tubes 13 and 15 are conducting and that the tubes 12 and 14 are non-conducting. The potential of the anode of tube 12 is substantially the same as the positive terminal of the battery 36, for example, 222 volts. This is also true of the potential of the anode of tube 14. The potential of the anodes of tubes 13 and 15, however, are at some lesser positive potential, say 192 volts. Consequently, the grids of the valve tubes 18 and 19 are at positive potentials of approximately 207 volts; in other words, at a potential which is midway between the potentials connected to the terminals of the voltage dividers comprising resistances 21—22 and 23—24. The cathodes of the valve tubes are connected to a point on the voltage divider 37 which is at a potential of approximately 218 volts. Thus, it is seen that the grids of both valve tubes are biased sufficiently negative with respect to their associated cathodes to inoperatively condition the tubes.

Assume that the polarity of the potential appearing at the terminals of section E of the delay network 1 reverses to initiate conduction in the switching tube 12 and to stop conduction in the tube 13. Now the anode of tube 12 is at a potential of approximately 192 volts, and since the condition of the switching tube 15 is unchanged, the anode of this tube is also at the same potential. Consequently, the grid of valve tube 19 is also at a potential of approximately 192 volts. Thus, the valve tube 19 is biased even more negatively than before and thereby still prevents the flow of space current in the tube. Also the anode of switching tube 13 is raised to a potential of approximately 222 volts, which is the potential of the anode of tube 14, and therefore the grid of the valve tube 18 is also raised to this potential which operatively conditions the tube, since the grid is now positive with respect to its 218 volt cathode. As soon as the transient voltage appears at the terminals of section F of the delay network, conduction is stopped in switching tube 15 and initiated in tube 14, and it may be seen that the original voltage conditions affecting the valve tubes 18 and 19 are restored.

If, while the valve tube 18 is operatively conditioned, the polarity of the signals reverses, a short impulse is generated in the secondary winding of transformer 25 and will be of such a character that current will flow through the lower half of the secondary winding, the neon lamp 38 and the space path in the tube 18, thereby flashing the lamp 38. It will be seen that, if the signal reversal occurs at an earlier time, while the transient voltage is traversing some of the first sections of the delay network, others of the lamps in the banks M and S will be lighted, depending upon the time that the signal reversal occurs and upon whether a marking or a spacing signal is biased.

As it will presently appear, the valve tubes 18 and 19 are alternately conditioned for operation to prepare for the operation of either of the neon lamps 38 or 39 at the time that a reversal of the signaling conditions occurs when the signals are normal undistorted signals. As a result of this arrangement, so long as the received signals are undistorted the lamps 38 and 39 will flash. Distortion of the signals which results in either a marking or spacing biasing thereof will prevent the operation of the lamps 38 and 39 and will cause the intermittent flashing of some of the other lamps in the banks M and S. By the term "bias" as used in the specification and claims is meant the increase in the length or the time duration of a signal. Any such lengthening of a signal must be made at the expense of either the preceding or the succeeding signal which then results in a corresponding shortening of such a signal. Consequently, it is seen that the distortion indicator in accordance with the instant invention operates in a manner which determines the approximate degree of signal shortening and indicates it in terms of the degree to which the preceding or following signal of the opposite character is biased or lengthened.

For illustrative purposes it is assumed that seven-unit start-stop signals are to be observed by the signal distortion indicator herein disclosed. The usual rate of transmission systems employing such signals is 390 characters per minute. Under these conditions the normal length or time duration of each unit signal is 22 milliseconds. Consequently, the parameters of the delay network 1 are adjusted to cause a delay of approximately 22 milliseconds in the propagation of a transient voltage applied to one terminal of the network. Depending upon the magnitude of the increments in terms of which the distortion is to be measured, connections are made at appropriate points in the network to correspondingly control the operation of the switching and valve tubes. In this disclosure these increments are chosen to indicate signal distortion in percentages of 2.5, 5, 10 and 15. Accordingly, section A of the network is arranged to delay the propagation of a transient voltage therethrough for 11 milliseconds. The following section B delays the transient voltage for 7.7 milliseconds. Likewise, the delays introduced by sections C and D are each 1.1 milliseconds, and that introduced by section E is .55 millisecond. Section F of the network is arranged to delay the propagation of the transient voltage for .55 millisecond to approximately the midpoint of the inductances 2 and 3 and for substantially the same time before it appears across the terminals of this section.

As previously described, a reversal of the signaling conditions occurring while the voltage transient is traversing section F of the network is indicated as representing a normal signal having no appreciable distortion. However, it may be seen that provision is made for some slight variation in the time that such a signaling condition reversal may occur and yet be indicated as an undistorted signal. Thus, a signal may be shortened or lengthened up to .55 millisecond which is a maximum distortion of 2.5% and yet be indicated as a normal undistorted signal. In practice such a small distortion usually is tolerable and has no appreciable detrimental effect upon the operation of the signal receiving or translating device. It will be obvious to those skilled in the art that suitable adjustments of the parameters of section F of the delay network 1 may be made to increase or decrease the allowable tolerance in what are termed herein normal undistorted signals.

For a brief description of the manner in which the distortion indicator operates to indicate the approximate degree of distortion, assume that a unit spacing signal is followed immediately by a unit marking signal. Also assume that the total time duration of the two signals is 44 milliseconds which means that the average time duration for each signal is 22 milliseconds. But also assume that, for some reason, the time duration of the spacing signal is shortened by 3 milliseconds to make the total time duration of the spacing signal 19 milliseconds and that the time duration of the following marking signal is increased by 3 milliseconds to 25 milliseconds. Such a condition represents a 13.6% marking bias of the signals. Just prior to the receipt of the spacing signal all of the lower switching tubes such as 13 and 15 are conducting, and all of the upper switching tubes such as 12 and 14 are nonconducting. At the instant of occurrence of the reversal initiating the spacing signal, the potential applied to the delay network 1 is reversed, making the upper conductor thereof positive with respect to the lower conductor. When the transient potential has traversed section B of the network, positive and negative potentials are impressed by the conductors including resistances 41 and 42 respectively upon a pair of switching tubes whereby the upper one of the pair corresponding to tube 12 is rendered conducting and the lower one of the pair corresponding to tube 13 is rendered non-conducting. As a result of this operation, the upper one of a pair of valve tubes corresponding to tube 18 is conditioned for operation for the conduction of current through its output circuit which includes a conductor 43. Since the time duration of the spacing signal is only 19 milliseconds, a signal reversal between the spacing and marking signals occurs at the time when the transient voltage is traversing section C of the delay network. This signaling condition reversal causes the generation of a short impulse in the secondary winding of transformer 25 which is applied through the lamp 44 and over conductor 43 through the valve tube corresponding to the tube 18. The lamp 44 flashes to indicate that there exists a marking bias in the signals of at least 10%, but not greater than 15%. If the marking bias had been greater than 15%, the lamp 45 would have been caused to flash in a similar manner. Under the assumed conditions, the actual percentage of marking bias is 13.6.

Other percentages of distortion of the signals causing either a marking or a spacing bias thereof are indicated by appropriate lamps in the banks M and S in a manner which should be obvious from the foregoing description.

If, instead of the conditions which were assumed for the foregoing description, it is assumed that the first of the two signals is of a marking character and the second of a spacing character and the reversal between the two signaling conditions is affected by interference in the same sense and to substantially the same degree, then the time duration of the marking signal is decreased at the expense of the following spacing signal which is increased by approximately 3 milliseconds. The operation of the distortion indicator in response to such conditions is that at the time of the reversal between the marking and spacing signaling conditions the delay network transient voltage is traversing section C. The potential applied to the grid of the lower switching tube corresponding to tube 13 by the conductor which includes resistance 42 is positive, and the potential which is applied to the grid of the upper switching tube corresponding to tube 12 by the conductor including the resistance 41 is negative with respect to the cathodes of these tubes. The lower tube is thus rendered conducting and the upper tube rendered non-conducting to operatively condition the lower valve tube corresponding to tube 19 so that the output circuit of this tube which includes conductor 46 and the lamp 47 is energized in response to the signal reversal, thereby flashing the lamp 47. As in the previous case, the indication is that the spacing signal is biased to between 10% and 15% of normal.

If the average signaling rate increases in the amount of, say 5%, the time duration of all signals, both marking and spacing, is decreased on the average by 5%. Such a condition is indicated by the steady glowing of the lamps 48 and 49.

Should the average rate of signal transmission decrease in the amount of, say 2.5%, the time duration of all signals, both marking and spacing, is increased on the average by 2.5%, a 2.5% change in the time duration of a signal based on the assumed transmission rate of 390 characters per minute is .55 millisecond. Thus, due to the assumed decrease in the signal transmission rate, the time duration of each signal on the average is 22.55 milliseconds. Since it has been demonstrated that it requires substantially 22.55 milliseconds for a complete traversal of the delay network 1 by the transient voltage, it is seen that, coincident with the average reversal of the signaling conditions, steady state conditions are beginning in the delay network. Consequently, there are none of the valve tubes corresponding to tubes 18 and 19 conditioned for operation at this time, and therefore none of the lamps in the banks M and S is operated.

The distortion indicator in accordance with the instant invention is also provided with apparatus for operating a trigger controlled alarm device such as an audible signal to indicate the existence of signal abnormalities of a predetermined character. Associated with each of the indicating lamps in the banks M and S used to indicate signal distortion, that is, all lamps except 38 and 39, are contacts which may be selectively engaged respectively by switch arms 51 and 52. When either of the switch arms is positioned on contacts other than those labeled "off," windings 53 and 54 respectively of a transformer 55 are connected in parallel with one of the indicating lamps. The secondary winding 56 of this transformer is connected between the starter anode of a gaseous conduction tube of the cold cathode tube 57 and a point on the voltage divider 37 which is positive with respect to the point on the voltage divider to which the cathode of the tube 57 is connected. The output circuit of the tube 57 includes a bell, buzzer, or other alarm device 58 and a push button switch 59.

The switch arms 51 and 52 may be set on any of their associated bank contacts, depending upon the percentage of signal distortion for which it is desired to operate the alarm 58. As soon as the appropriate valve tube corresponding to tubes 18 and 19 is rendered conducting, the space current flows through either the transformer winding 53 or 54 to induce a voltage of sufficient magnitude in the secondary winding 56 to initiate conduction in the tube 57 whereby the alarm 58 is operated. Following such operation, the actuation of the push button switch 59 silences the alarm by momentarily disconnecting the plate potential for the tube 57.

The nature of the invention may be ascertained from the foregoing description of an illustrative embodiment thereof, it being understood that modifications of the invention may be made within the scope of what is claimed without departing from the spirit of the invention.

What is claimed is:

1. In a telegraph signal distortion indicator, a delay network comprising a cascaded arrangement of a plurality of sections, means responsive to each signal transition for impressing upon one terminal of said network a voltage for propagation therethrough at a rate determined by the parameters of said network sections, means for deriving from successive sections of said network a series of impulses, means responsive to each transition from one signaling condition to another for generating another impulse, a plurality of indicating devices arranged to be influenced collectively by said another impulse and individually by respective ones of said series of impulses, and means for operating one of said indicating devices to show the approximate time distortion of the telegraph signals when two successive impulses generated by signal transitions occur at a frequency different from the propagation rate of said network.

2. In a telegraph signal distortion indicator, a delay network comprising a cascaded arrangement of a plurality of sections, the propagation rate of said network being substantially equal to the normal signaling frequency, means controlled by the transition from one signaling condition to another for impressing a voltage upon one terminal of said network for propagation therethrough, a plurality of electronic switching devices connected respectively to the terminals of individual sections of said network to be conductively conditioned by voltages appearing at said network section terminals, a plurality of electronic valve devices arranged to be operatively conditioned by respective ones of said plurality of electronic switching devices, a plurality of indicating lamps connected respectively to the output circuits of said electronic valve devices, and means controlled by each signal transition for generating another impulse for the control of energy for the output circuits of said electronic valve devices whereby one of said indicating devices is operated when two successive signal transitions occur at a greater than normal frequency.

3. In a telegraph signal distortion indicator, a delay network comprising a cascaded arrangement of a plurality of sections and having time delay constant substantially equal to the time duration of a normal signal, means responsive to changes from one signaling condition to another for impressing a voltage upon one terminal of said network for propagation therethrough, a plurality of indicating devices successively prepared for operation under the control of voltages derived from successive sections of said network, and means utilizing an impulse generated under the control of one of said signaling condition changes to actuate an operatively prepared one of said devices when two successive signaling condition changes occur at a frequency different from the propagation rate of said network.

4. A telegraph signal distortion indicator comprising a plurality of indicating devices, one for each of a plurality of predetermined percentages of signal distortion, a multi-section delay network, means controlled by each transition from one signaling condition to another for impressing upon one terminal of said network a voltage for propagation therethrough, means controlled by voltages derived from successive sections of said network for successively conditioning for operation each of said indicating devices, and means controlled by each signal transition for actuating an operatively conditioned one of said indicating devices when two successive signal transitions occur at a frequency different from the normal signal frequency.

5. A telegraph signal distortion indicator comprising a plurality of indicating devices, one for each of a plurality of predetermined percentages of signal distortion, a multi-section delay network, means controlled by each transition from one signaling condition to another for impressing upon one terminal of said network a voltage for propagation therethrough, means including electronic devices controlled by voltages derived from successive sections of said network for successively conditioning for operation each of said indicating devices, and means including an electronic impulse generator controlled by each signal transition for actuating an operatively conditioned one of said indicating devices when two successive signal transitions occur at a frequency greater than the normal signal frequency.

6. A telegraph signal distortion indicator comprising a plurality of indicating devices, one for each of a plurality of predetermined percentages of signal distortion, a multi-section delay network, means controlled by each transition from one signaling condition to another for impressing upon one terminal of said network a voltage for propagation therethrough, a plurality of electronic devices, each having input and output circuits, said output circuits including respective ones of said indicating devices, means controlled by voltages derived from successive sections of said network for successively conditioning for operation the input circuits of each of said electronic devices, and means controlled by each signal transition for supplying energy to the output circuit of one of said electronic devices having an operatively conditioned input circuit to actuate the associated one of said indicating devices when two successive signal transitions occur at a frequency greater than the normal signal frequency.

7. A telegraph signal distortion indicator comprising a multi-section delay network, means controlled by each transition from one signaling condition to another for impressing upon one terminal of said network a voltage for propagation therethrough, means for indicating a plurality of predetermined percentages of signal distortion, means for deriving from successive sections of said network voltages corresponding in time with reference to said impressed voltage to said plurality of predetermined percentages of signal distortion, means controlled by each signal transition for generating another impulse, and means utilizing said another impulse and one of said voltages derived from said network for actuating said indicating means.

8. The invention defined in claim 7 wherein said indicating means comprises a plurality of lamps, one for each percentage of signal distortion.

HAROLD F. WILDER.

REFERENCES CITED

The following references are of record in the file of this patent:

UNITED STATES PATENTS

| Number | Name | Date |
|---|---|---|
| 1,992,363 | Erickson | Feb. 26, 1935 |
| 1,971,148 | Wise | Aug. 21, 1934 |
| 1,845,994 | Wise | Feb. 16, 1932 |
| 1,844,887 | Herman | Feb. 9, 1932 |